DRAPERY SUSPENSION DEVICE

Original Filed May 20, 1955 3 Sheets-Sheet 1

INVENTOR

Baldwin King

BY Shreve, Crocker & Gordon

ATTORNEYS

DRAPERY SUSPENSION DEVICE

Original Filed May 20, 1955 3 Sheets-Sheet 2

INVENTOR
Baldwin King

BY Shreve, Crowe & Gordon
ATTORNEYS

DRAPERY SUSPENSION DEVICE
Original Filed May 20, 1955 3 Sheets-Sheet 3
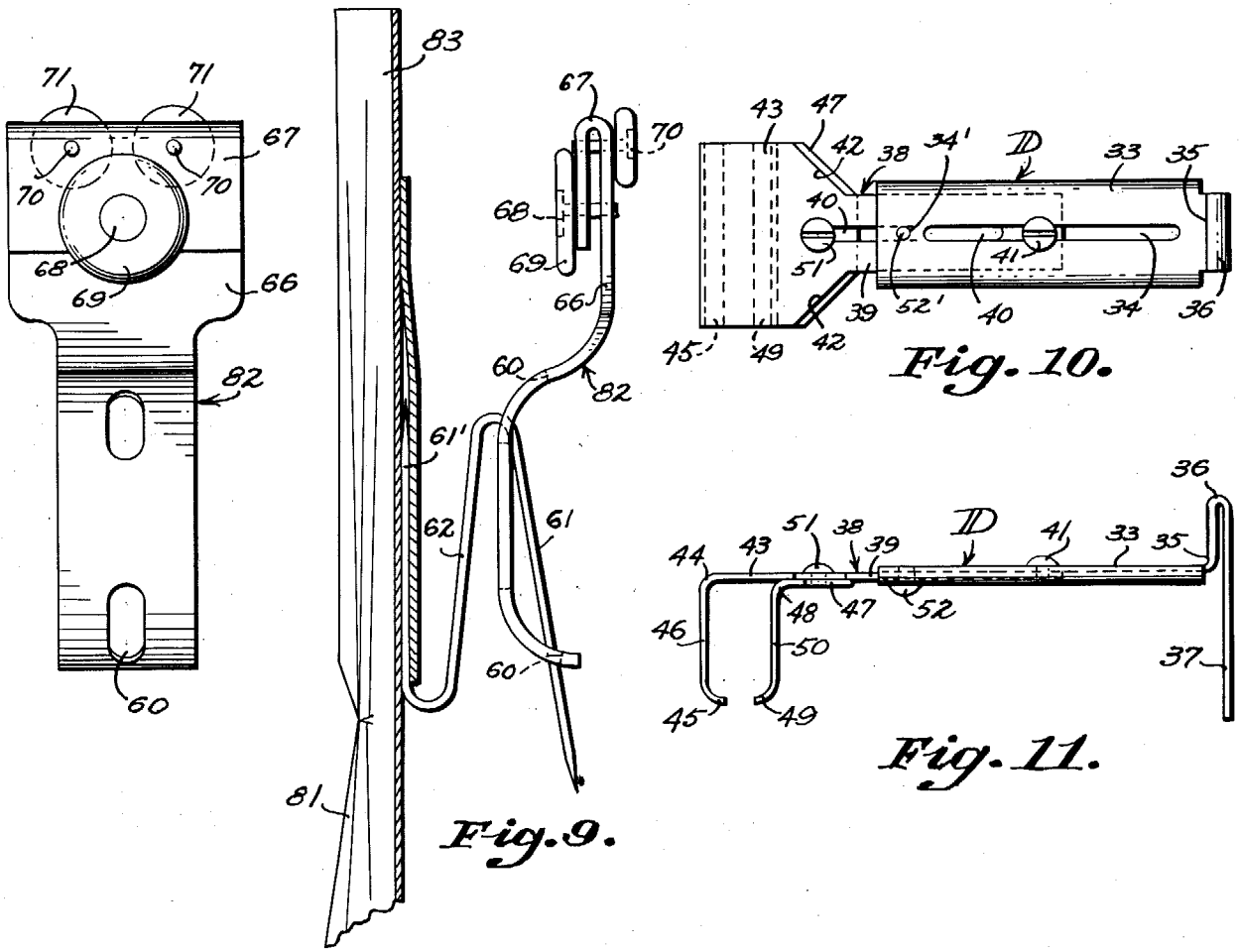
INVENTOR
Baldwin King
BY Shrevo, Crowe & Gordon
ATTORNEYS United States Patent Office Re. 25,310
Reissued Jan. 1, 1963

25,310

DRAPERY SUSPENSION DEVICE

Baldwin King, 1110 4th Ave., Albany, Ga.

Original No. 2,840,159, dated June 24, 1958, Ser. No. 509,799, May 20, 1955. Application for reissue June 20, 1960, Ser. No. 37,539
4 Claims. (Cl. 160—346)

Matter enclosed in heavy brackets [ ] appears in the original patent but forms no part of this reissue specification; matter printed in italics indicates the additions made by reissue.

This invention relates to traverse equipment comprising a traverse rod and means movable thereon supportingly attached to the upper portion of curtains or draperies, and cord means attached to certain of said movable means, the construction and coacting arrangement of the rod and movable means being such, that when slight force is applied to said cord, the curtain or draperies are smoothly and silently moved in opening and closing directions, as desired.

Traverse rods and equipment as now constituted present a variety of problems, by reason of the rods being designed to carry a number of curtain supporting carriers or slides, including a pair of master carriers adapted to move along the rod in meeting and separating directions with respect to each other, and being controlled by a draw cord being attached to each master slide, for moving said carriers in opposite directions: Such cord being mounted in the rod and extending beyond the end of the rod frequently gets hung with some of the carriers and/or slides, and locks the curtains from movement in either direction; therefore, an important object of this invention is the provision of a rod construction including means for mounting the cord rearwardly of the rod, thereby eliminating its contact with the carriers and effecting, in such regard, the unhampered operation of the curtains in opening and closing direction.

Another important object of this invention is the provision of a hollow traverse curtain rod having a bottom slot extending throughout its length, a carrier track on the inner surface of the bottom wall adjacent to one side, and an offset carrier track on the under side of the top wall adjacent to the opposite side, the respective carriers having means extending through said slot and engageable with said curtain, their construction and engageable contact arrangement with said track being such as to maintain the carriers in perpendicular non-interfering positions as well as the curtains, at all times during their travel in curtain opening and closing directions.

On account of the construction and coacting arrangement of the rods and carriers now being manufactured, the curtains come into frictional contact with the rod, and frequently one or the other of the overlapped curtains is dragged or caused to move in the wrong direction by movement of the other, and by reason of the construction and mounting of the carriers they are caused to assume positions out of the perpendicular and to become locked with each other, so that the curtains cannot be moved in either direction: Therefore, one of the principal objects of this invention is the provision of a traverse rod construction, and coacting carrier construction including anti-friction wheels arranged not only to smoothly support but to bracingly cause the carriers to remain and travel at all times, irrespective of varying weight conditions, in perpendicular positions and similarly supporting the curtains out of frictional engagement with the rod.

A further important object of this invention is the provision of a curtain carrier member of this character having an outwardly and downwardly extending portion provided with a pair of vertically spaced openings adapted to receive a curtain attaching pin in a manner to support the curtain engaging portion of the pin perpendicularly spaced from the rod, and which in turn also holds the heading of the curtain straight up, thereby preventing the heading breaking over the top.

A further object of this invention is the provision of a center rod supporting adjustable bracket, including rod engaging jaws substantially conforming to the shape of the rod and not only designed to support the rod and to prevent its tendency to twist under heavy curtain weight conditions, but also to serve as a splicer for the meeting ends of rod sections.

A still further object of this invention is the provision of a traverse curtain rod and pulley supporting an adjustable bracket assembly for detachably holding each end of the rod against turning or twisting and including means for mounting the draw cord pulleys rearwardly of the end of the rod.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures of which:

FIG. 8 is a front elevation of an intermediate carrier.

FIG. 9 is a side elevation of an intermediate carrier and a fragmentary vertical section of the top portion of the drapery in vertical position as supported by the carrier.

FIG. 10 is a top plan view of the center rod supporting bracket.

FIG. 11 is a side elevation of FIG. 10.

Figures 1, 2, 3:
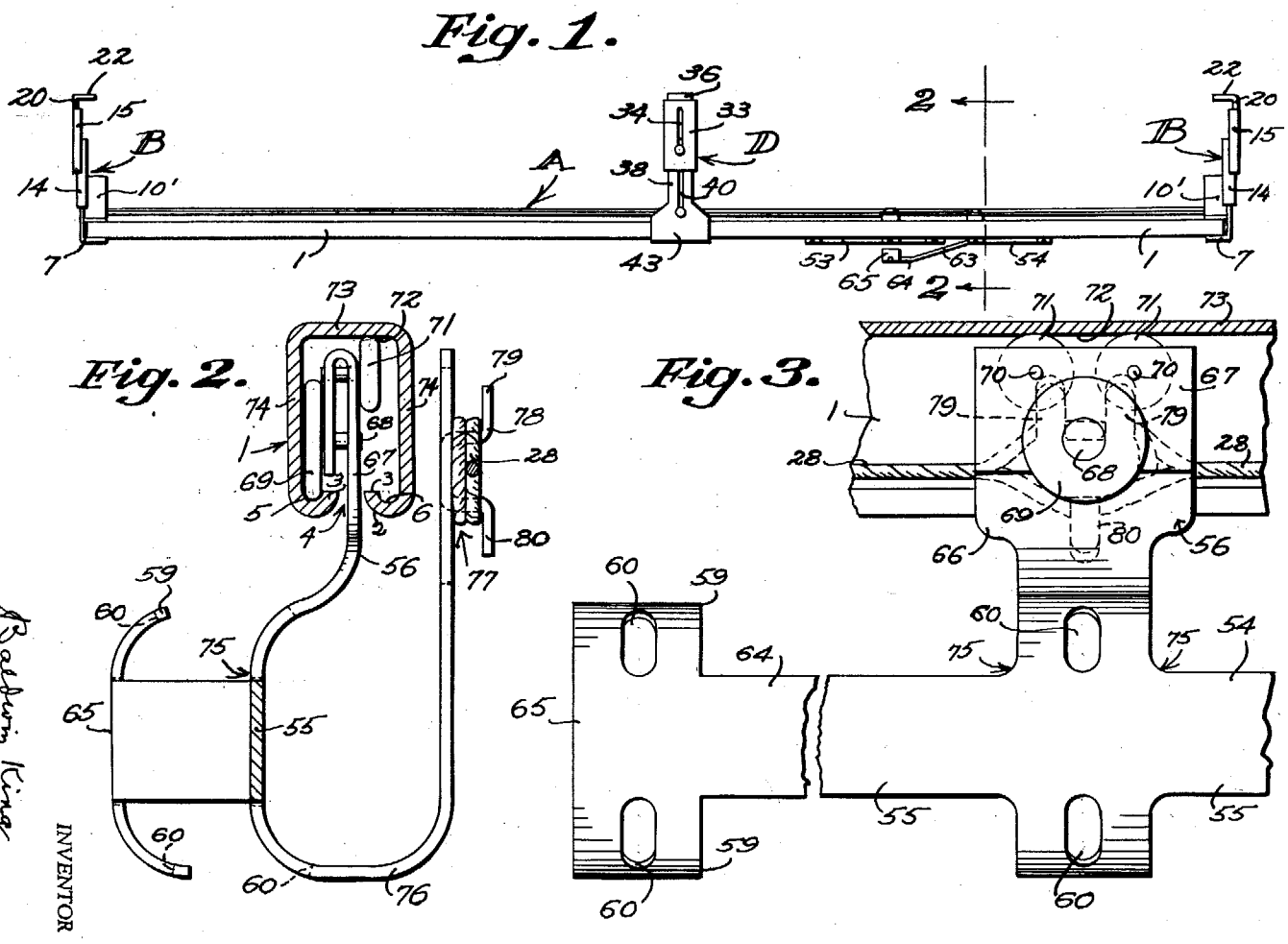
FIG. 1 is a top plan view of the assembled curtain rod structure.
FIG. 2 is an enlarged cross-section taken on the line 2—2 of FIG. 1.
FIG. 3 is a fragmentary elevation of a master carrier or slide and a partial vertical section of the curtain rod.

In the illustrated embodiment characterizing this invention there is shown in FIG. 1, which is, a traverse rod structure comprising a curtain or drapery tubular rod 1 rectangular in cross section having a narrow bottom wall 2 which, midway of its width, is cut or divided longitudinally of its length and with the cut edges 3 bent upwardly, thereby forming a slot 4, a front track 5 and rear track 6 on opposite sides of said slot, which slot extends throughout the length of the tubular rod 1, as and for a purpose directly more fully appearing.

Figures 4, 5, 6, 7:
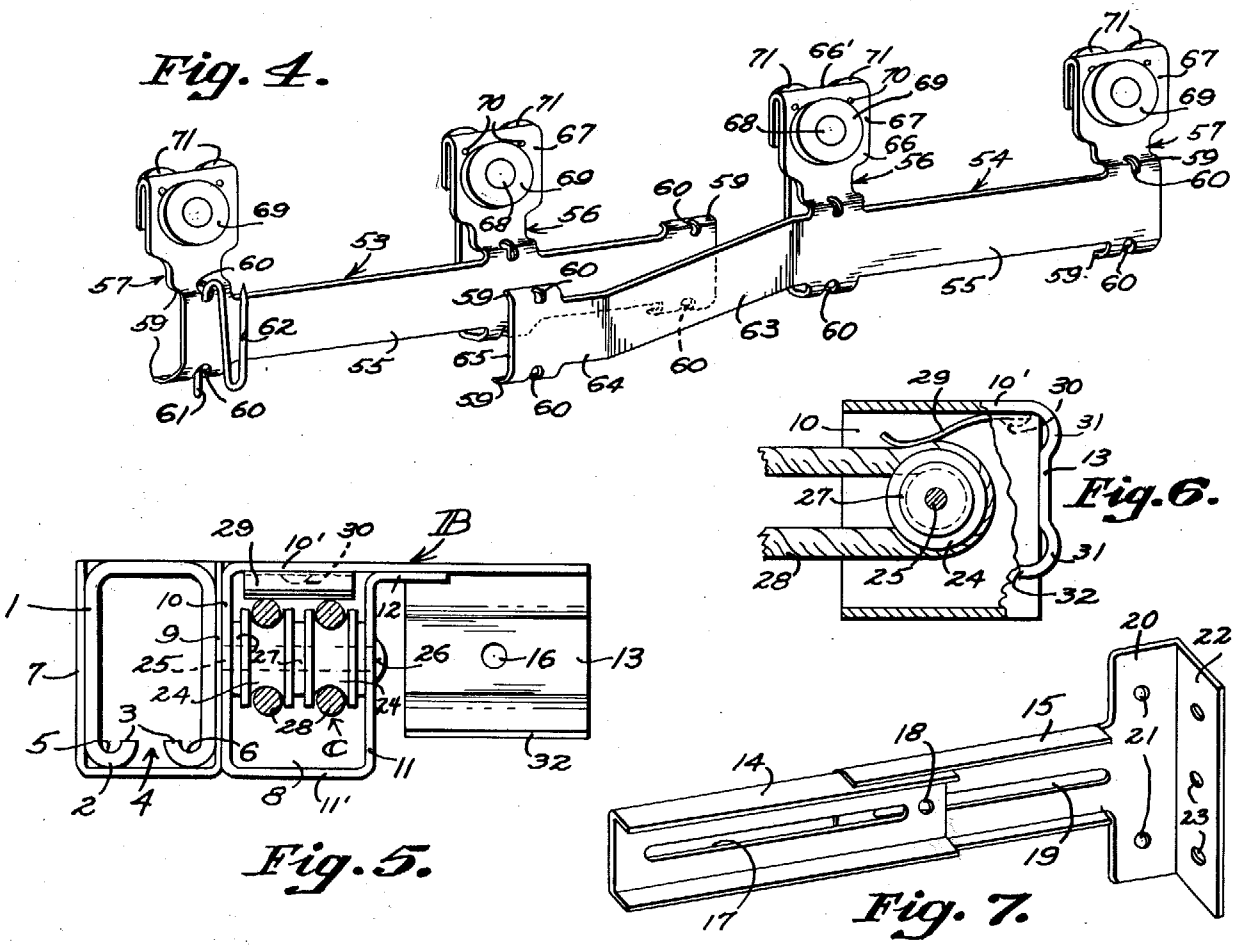
FIG. 4 is a perspective view of the two sections of the master carrier.
FIG. 5 is a side elevation of the pulleys with the cord in sections.
FIG. 6 is an end view of pulley assembly showing parts in section.
FIG. 7 is a partial perspective view of the end bracket structure.

A draw cord pulley mounting and rod supporting adjustable bracket assembly B (FIGS. 5, 6, and 7), is adapted to engagingly support each end of the traverse rod A, each of said bracket assemblies comprising a cup member 7 shaped to supportingly receive one end of the rod 1. A pulley housing or compartment 8 shaped substantially similar to cup member 7 is mounted on the rear side wall 9 of said cup member 7 with its front wall 10 spot welded thereto. The wall 10 extends rearwardly over and beyond the upper end of rear wall 11 of housing 8 as top wall 10' and is spot welded to the upper rearwardly extending end 12 of wall 11, which latter extends from wall 11 to wall 10 as the bottom wall 11' of housing 8. A stub section 13 substantially C-shaped in cross section is spot welded or otherwise secured to the extension 12 and is adapted for telescopic engagement with a similarly shaped intermediate section 14 adapted for engagement with the foot or anchor section 15 of the bracket assembly B. The section 13 is formed with one or more apertures, section 14 with longitudinal slot 17 and an opening 18, and section 15 with a similar slot 19, all adapted to receive a bolt or bolts (not shown) to lock the interfitting telescoping parts in adjusted position in accordance with the desired length of said rod supporting brackets B. The anchor section 15 is formed with an integral T-shaped plate 20 having a pair of openings 21, and an integral right angle plate section 22 having three or more openings 23 to receive screws or other suitable means for rigidly mounting the bracket on a wall or side or face of a window or door frame, and, in accordance with the particular requirements, the intermediate section 14 may be dispensed with and the section 13 directly and adjustably secured to member 15.

A pulley and draw cord structure C is mounted in the housing 8 of each bracket assembly B, and comprises a pair of pulleys 24 rotatably mounted on a shaft pin 25 formed with a screw head 26 at one end and, in the present instance, threaded at the other end (not shown). Said pin 25 is adapted to extend through the wall 11 and to threadedly engage in a threaded opening (not shown) in the opposite wall 10. Mounted on the shaft pin 25 intermediate the pulleys 24 and between the pulleys and the walls 10 and 11 are the washers or spacers 27 to permit free rotation of the pulleys by a draw cord 28 adapted to travel over the pulleys when operated by a person desiring to move the curtains or curtain in opening and closing direction as hereinafter more fully explained.

A leaf spring 29 (FIG. 6) is mounted in the housing 8 and is attached to the under surface of the top wall 10' by a rivet pin 30, said spring 29 being curved downwardly into contact with the surface of the draw cord portions in both pulleys, and then slightly upward at its free end to permit freedom of movement of the cord in both directions, and at the same time to act as a brake to sufficiently restrain the cord as to prevent loose stretches becoming tangled. Member 13 is formed at its upper and lower edges with curved portions 31.

Where the traverse rod A is more than approximately five feet in length a center support bracket structure D is needed. This bracket not only supports the weight of the rod and that of the curtain or draperies carried thereby, but also is designed to brace the rod 1 and prevent its tendency to twist under load stresses. This bracket structure D comprises a flat or telescopic section 33 formed with a longitudinal slot 34 and an opening 34', and beginning substantially midway of its length it is formed with a narrow flat portion 35 bent upwardly into a loop portion 36 and then extending perpendicularly below the portion 33 forming a vertical flat portion 37 adapted to seat against a wall window frame or the like, and formed with screw receiving openings similar to openings 23 in member 22 of bracket member 15 for attaching the bracket to a wall or the like.

A complemental section 38 comprising a portion 39 adjustably engages in member 33 and is formed with a longitudinal slot 40 and a threaded opening (not seen) registering with slot 34, the complemental section 38 being adjustably secured to telescopic section or member 33 by a screw bolt 41 engaging in said opening. Portion 39 of complemental section 38 is formed with angle edges 42 defining a widened portion 43 bent downwardly as at 44 and inwardly as at 45 forming a gripping portion 46. There is provided a complemental member 47 adapted to underlie member 43 and is bent at 48 and at its free end is bent inwardly as at 49 towards end 45 forming a complemental gripping portion 50 similar to 46. Member 47 is provided with a threaded opening (not shown) registering with slot 40 in portion 39, extending into portion 43, and adapted to receive the threaded end of a screw pin 51 extending through slot 40 for securing the member 50 in adjusted position when the members 46 and 50 have been placed in gripping position about the rod 1. The bracket portion 33, spaced from the end of and in alignment with slot 34, is provided with a threaded opening for engaging the end of the screw pin 52 extending through slot 40 and the opening in member 33 as at 52' (FIG. 10) for further rigidly interlocking in adjusted position members 33 and 39.

The apron-like gripping jaw members 46 and 50 conform to the configuration of the rod 1 (FIGS. 1, 2, 10 and 11) when in gripping engagement with said rod, and when the member 37 is rigidly attached to a wall or the like, will more effectively, in addition to supporting the rod, maintain said rod against any tendency to twist under the stresses of load conditions. Also, by reason of the construction of the jaw elements 46 and 50, this center rod supporting structure D, where two or more lengths of rods are required, serves as a splicer for supporting and housing the meeting ends of the rods, without any modification whatsoever.

In connection with the rod and carrier structures it will be apparent that the particular rod structure as shown in cross-section in FIG. 2 is designed to properly house and to coact with the particular rod engaging carrier members shown in FIGS. 2, 3, 4, 8 and 9 to effect the desired operating results.

In the present instance, the area or opening to be curtained requires two curtains or draperies, as the case may be, their meeting edges being adapted to overlap midway of the area.

With respect to the curtain carriers, there is employed a pair of carrier structures 53 and 54 usually termed "master" carriers. Master carrier 53 is termed a left hand carrier and is attached to the meeting edge of the left hand curtain adjacent to its upper end, and similarly the master right hand carrier structure 54 is attached to the meeting edge of the right hand curtain. The master carrier structure 53, is in the form of a bar 55 integrally connected with a control draw cord attaching carrier member 56 intermediate its length, and at one end with a substantially similar carrier member 57, the bar 55 extending beyond carrier 56 and at its free end 58 it is formed with laterally curved portions 59 provided with vertically aligned openings 60 adapted to receive the portion 61 of a curtain attaching pin 62 to maintain the curtain engaging stem portion 61' and the curtain in perpendicular position as shown in FIG. 9.

The right hand master carrier 54 is similar to the master carrier 53 and is also formed with an end carrier member 57 and a draw cord attaching carrier member 56, except the portion projecting beyond carrier member 56, is longer than the like portion of 53, and comprises an outwardly directed angle portion 63 and a short inwardly bent portion 64 terminating in a free end 65 formed with laterally curved portions 59 having vertically aligned openings 60 similar to those of the free end 58 of carrier 53. The end 65 is adapted to be attached to the meeting edge of the right hand curtain, and in closed position to overlap said left hand master carrier 53 (FIG. 1), as will be well understood.

Since the rod engaging and cord attached carrier members 56 of the master carriers 53 and 54 are identical, only the carrier member 56 of master carrier 54, as shown in FIGS. 2 and 3, will be described in detail.

The carrier members 56 of the master carriers 54 and 55, in the present instance, are constructed from a flat strip 66 of metal, but may be of plastic, such strip 66 being moulded or bent upon itself, as at 66', into overlying spaced relation to form at its upper end a widened and thickened head portion 67 (FIGS. 3 and 4), through which extends and is suitably secured the lower shaft member 68 (FIG. 2) on the free end of which is rotatably mounted the relatively large anti-friction wheel 69 adapted to travel in the forward track 5 of rod 1. A pair of spaced smaller shafts or rods 70 are similarly mounted in said head adjacent to its upper end and project from the opposite side of the head, and on the free ends of which are rotatably mounted the small anti-friction wheels or rollers 71 adapted to project slightly above the head 67 adjacent to the opposite edges thereof for engagement with the flat upper track 72 of the top wall 73 which interconnects the vertical side walls 74 of the rod 1.

It will be noted that the traverse rod 1 is not only rectangular in cross section, adapted to present a strong structure capable of supporting heavy curtains and draperies, but it is additionally designed to house and to provide spaced tracks at its lower end, the forward track 5 adapted to support the large carrier wheel 69 of the carrier 56 of the master carrier 54, and to provide at its upper end the flat under surface upper track 72 for the spaced small wheels 71, which latter provide a track engaging area of a length substantially equal to the width of the carrier head 67 (FIG. 3). The flat strip 66 extends downwardly from the head 67 through the slot 4 (FIG. 2), and forwardly and downwardly and, in the present instance, merges with the bar 55 as at 75 in advance of the forward wall 74 of rod 1, and thence upwardly forming a cord attaching section 77, extending to and in spaced relation with the rear side wall of the rod. A U-shaped member 78 is formed by pressing out from section 77, spaced from its upper end, portions which form the oppositely extending ears or prongs 79 and an intermediate prong 80 to secure the cord 28 to the carrier member 56 of the master carrier 54 (FIGS. 2 and 3).

The cord 28 is similarly secured to the similar cord attaching member 78 mounted on the upstanding cord attaching section 77 of the carrier 56 of the master carrier 53. Also it will be understood that the respective end carriers 57 of the master carriers 53 and 54 are identical with the carrier members 56, except that they do not have the extending cord attaching members 79 and 80.

The small wheels 71 of the carrier head 67 engageable with the upper track 72 (FIGS. 2 and 3) present with the supporting wheel 69 a three point track engageable contact, the curtain weight or load supporting wheel 69 with the track 5 and the upper offset wheels 71 engageable in opposite and carrier bracing direction with the upper track 72, thereby under all operating and varying curtain weight conditions, the carrier head and curtain attaching forward portion as at 75 are at all times in perpendicular or vertical position, and, therefore, when the pins 62 are operatively attached to the curtains 81 by their insertion in the openings 60 of the respective sets of openings in the carrier members 56 and 57 of the master carriers 53 and 54 and of the respective intermediate carriers 82, as shown in FIG. 9, all of said carrier members, by reason of the construction of the rod 1 and the construction and arrangement of the carrier heads 67 and their depending forward members as at 75, the curtains 81 and the upstanding top portions 83 thereof will be maintained in perpendicular position without frictional contact with the rod 1, and without interference of any kind during the curtain opening and closing operations.

In regard to the operation of a pair of curtains in opening and closing direction it will be noted that each bracket assembly B carries a pulley structure C positioned directly behind the end of the traverse rod 1 and which pulleys carry the cord 28. The purpose of the pulleys is to carry the cord at the rear of each end of the rod. This cord should pass over one of these pulleys, go to the other end of the rod and pass over another pulley on that end of the rod, and return to the first pulley and pass over the other pulley making the two ends of the continuous cord at one end of the rod. One part of this cord is fastened to member 78 on the left hand master carrier, and the other part is similarly fastened to the right hand master carrier, causing one carrier, when the cord is pulled, to travel to one end of the rod and the other carrier to travel to the opposite end of the rod in curtain opening direction, and oppositely in curtain closing direction, when the cord is pulled in the opposite direction, as will be well understood.

From the above it will be apparent that I have provided, in traverse equipment, a strong slotted curtain rod structure, including within the rod a lower carrier supporting track surface and an upper offset carrier track surface, a plurality of traverse curtain carriers adapted to travel on said track surfaces, the construction and arrangement of said carriers and tracks being such that said carriers, irrespective of the size and weight of the curtains, will be supported in upright position, said carriers adapted to maintain the curtains out of frictional engagement with the rod during the opening and closing operations, and an adjustable bracket rod end supporting assembly, each carrying a set of pulleys positioned to the rear of the end of the rod to support the drawcord, and a center rod supporting bracket structure, said bracket additionally serving as a splicer means for housingly supporting the meeting end of rod sections.

Although in practice I have found that the form of my invention illustrated in the accompanying drawings and referred to in the above description as the preferred embodiment, is the most efficient and practical, yet realizing that conditions concurrent with the adoption of my invention will necessarily vary, I desire to emphasize that various minor changes in details of construction, proportion and arrangement of parts may be resorted to within the scope of the appended claims without departing from or sacrificing any of the principles of this invention.

Having thus described my invention, what I desire protected by Letters Patents is as set forth in the following claims:

1. Traverse equipment for curtains and draperies, comprising, in combination, a traverse rod, means within the rod defining a pair of vertically off-set tracks, one of which is a bottom track, the other of which is an upper track, a pair of curtain-supporting carrier means mounted in the traverse rod having a large roller engaging the bottom track and a pair of longitudinally disposed small rollers engaging the upper track, the rollers coacting with the respective tracks for providing continuously a three-point mounting for maintaining the carrier means continuously vertical independently of amount of load thereon for rolling thereon the carrier means being movable along the tracks in opposite directions and supportingly attached to upper portions of curtains or draperies, draw cord means attached to each curtain-supporting carrier means for rollably moving each of carriers means in opposite directions along the traverse rod, and means for mounting the cord rearwardly of the said rod for eliminating contact between the cord and carrier means for effecting unhampered operation of the carrier means and curtains in opening and closing directions.

2. Traverse equipment for curtains and draperies, comprising, in combination, a traverse rod, means in the rod defining a pair of parallel vertically spaced and vertically off-set tracks, one of which is a bottom track, the other of which is a top track, a plurality of curtain-supporting carriers slidably mounted in the traverse rod each carrier having on one side a large roller engaging the bottom track, and a pair of small rollers on an opposite side engaging the top track, the said rollers providing continuously a three-point mounting for each carrier for maintaining each carrier continuously vertical independently of amount of load thereon, for rolling movement thereon in opposite directions, the said carriers including a pair of master carriers supportingly attached to upper portions of curtains or draperies and adapted to move along with traverse rod in meeting and separating directions with respect to each other, a draw cord attached to each master carrier for moving the carrier in opposite directions, and means for mounting the draw cord rearwardly of the rod and away from contact with the carries for effecting unhampered operation of the curtain in opening and closing directions.

[3. Traverse equipment for curtains and draperies comprising, in combination, a hollow, elongated traverse rod having a top portion defining an outer surface and an inner surface, a pair of complemental bottom portions defining outer surfaces and inner surfaces, and opposite side walls interconnecting the top portion and bottom portions, the bottom portions being separated by a longitudinal slot extending substantially throughout the length of the bottom portions, a curtain-carrier track on the inner surface of the bottom portion adjacent to the outer one of the side walls, an off-set carrier track on the inner side of the top portion adjacent to the side wall opposite to the first-mentioned side wall, a pair of master curtain carriers mounted on the tracks, each of the carriers having a large roller engaging the first mentioned track, and longitudinally aligned small rollers engaging the off-set carrier track and cooperating with the large roller for continuously providing a vertical three-point support for the carrier, means on the carriers engageable with upper portions of a curtain for attaching the curtain to the carriers, the said carriers being movable along the tracks in meeting and separating directions with respect to each other, the curtain-attaching means for the carriers extending through the slot, a draw cord attached to each carrier for moving the carriers in opposite directions along the tracks, and means for mounting the draw cord rearwardly of the rod.]

[4. Traverse equipment for curtains and draperies comprising a hollow, elongated traverse rod having a top portion defining an outer surface and an inner surface, a pair of complemental bottom portions defining outer surfaces and inner surfaces, upper track means on the inner surfaces of the top portion, lower track means on the inner surface of the bottom portions, and opposite side wall members interconnecting the said top and bottom portions of the rod, the bottom portions of the rod being separated by a longitudinally extending slot, a plurality of curtain carrier means having head portions mounted within the rod and curtain hanger portions depending from the head portions and extending through the slot between the bottom portions of the rod, traveling instrumentalities mounted on the head portions of the curtain-carrier means, the instrumentalities including a pair of longitudinally aligned small rollers and a large roller on opposite sides of the head portions of the said curtain carrier means and positioned with the small rollers in engagement with the upper and with the large roller in engagement with the lower track means in the rod for continuously providing a three-point support for the curtain carrier means for maintaining and bracing the curtain-carrier means continuously in perpendicular relation with respect to the traverse rod, and means operatively connected to certain of the curtain carrier means for moving the latter in opposite directions.]

[5. Traverse equipment for curtains and draperies as claimed in claim 4, wherein there are provided a pair of curtain-carrier means depending from the traverse rod longitudinally off-set with respect to each other for preventing contact between meeting edge portions of curtains suspended from the curtain carrier means.]

[6. Traverse equipment for curtains and draperies as claimed in claim 4, wherein the traveling instrumentalities on the head portions of the curtain carrier means are anti-friction rollers extending oppositely from the said head portions and operating on the upper and lower track means in the traverse rod adjacent to the inner surface of the side walls of the said rod for continuously maintaining the curtain carrier means perpendicular to the rod and in relative non-interfering positions at all time during their travel in curtain opening and closing directions.]

[7. Traverse equipment for curtains and draperies as defined in claim 4, wherein the traverse rod comprises an adjustable rod-supporting bracket disposed approximately centrally with respect to the traverse rod, the said bracket including opposite rod-engaging jaws substantially conforming to the shape of the rod, for supporting the rod and preventing tendencies of the rod to twist under heavy curtain loads, the said jaws also being splicing means for meeting ends of contiguous rod sections.]

[8. Traverse equipment for curtains and draperies as claimed in claim 4, wherein the means operatively connected to the curtain-carrier means for moving the latter in opposite directions include adjustable bracket assemblies detachably holding opposite end of the traverse rod against tendencies to turn or to twist under heavy curtain loads on the curtain-carrier means, each bracket assembly including a housing, pulleys in the housing, and a draw-cord connected to the curtain carrier means and passing around the pulleys for simultaneously actuating the curtain carrying means in opposite directions for opening and closing the curtains.]

*9. Traverse equipment for curtains and draperies, comprising, in combination, a hollow traverse rod of rectangular cross section, means within the rod defining a pair of vertically spaced tracks, one of which is a bottom track, the other of which is an upper track, a pair of curtain supporting carrier means mounted in the traverse rod having a roller engaging one of said tracks and a pair of longitudinally spaced rollers engaging the other track, the rollers coacting with the respective tracks for providing a three point mounting for maintaining the carrier means vertical independently of the amount of load thereon, the carrier means being movable along the tracks in opposite directions and supportingly attached to upper portions of curtains or draperies, draw cord means attached to each curtain-supporting carrier means for moving each of said carrier means in opposite directions along the traverse rod, and means for mounting the cord rearwardly of the said rod for eliminating contact between the cord and the portion of the carrier means within the traverse rod for effecting unhampered operation of the carrier means and curtains in opening and closing directions.*

*10. Traverse equipment for curtains and draperies, comprising, in combination, a hollow traverse rod including means defining a pair of vertically spaced tracks, one of which is a bottom track and the other of which is an upper track, a pair of curtain supporting carrying means mounted in the traverse rod and having means movably engaging and coacting with the respective tracks for maintaining the carrier means vertical independently of the amount of load thereon, said carrier means being movable along the track in opposite directions and supportingly attached to upper portions of curtains or draperies, draw cord means attached to each curtain supporting carrier means for moving each of said carrier means in opposite directions along the traverse rod, and means for mounting the cord rearwardly of said rod for eliminating contact between the cord and the portion of the carrier means within the traverse rod for effecting unhampered operation of the carrier means and the curtains in opening and closing directions.*

References Cited in the file of this patent or the original patent

UNITED STATES PATENTS

| | | |
|---|---|---|
| 1,074,825 | Walsh | Oct. 7, 1913 |
| 1,294,589 | Wolfe | Feb. 18, 1919 |
| 1,494,427 | Kirsch | May 20, 1924 |
| 1,494,428 | Kirsch | May 20, 1924 |
| 1,494,429 | Kirsch | May 20, 1924 |
| 1,606,581 | Kirsch | Nov. 9, 1926 |
| 1,661,137 | Furlong | Feb. 28, 1928 |
| 1,829,297 | Rapp | Oct. 27, 1931 |
| 1,876,061 | Kirsch | Sept. 6, 1932 |
| 2,140,080 | Johnson | Dec. 13, 1938 |
| 2,709,831 | Mountain | June 7, 1955 |

FOREIGN PATENTS

| | | |
|---|---|---|
| 560,591 | France | July 13, 1923 |